W. C. LOGAN.
FLY TRAP.
APPLICATION FILED APR. 20, 1909.
952,454.
Patented Mar. 22, 1910.
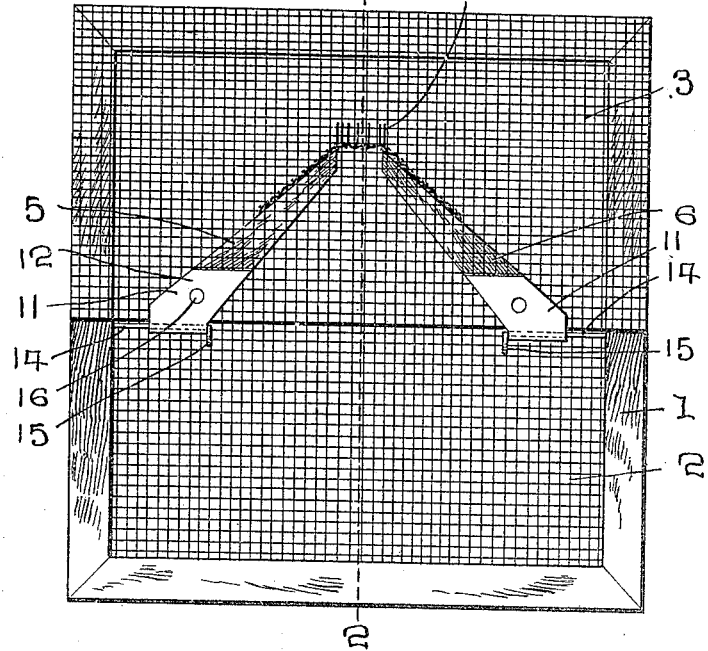
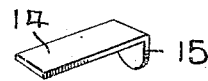
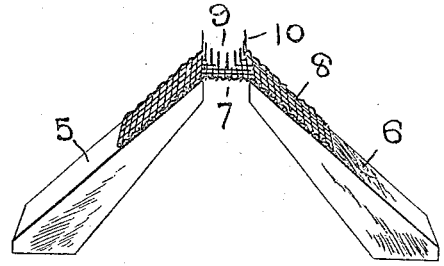
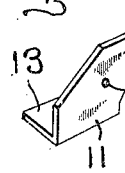
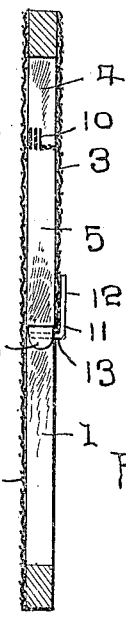
WITNESSES:
Thos. W. Riley
M. A. Newcomb
INVENTOR
W. C. Logan
BY
W J Fitzgerald
Attorney

UNITED STATES PATENT OFFICE.

WILLIAM C. LOGAN, OF HEADEN, GEORGIA.

FLY-TRAP.

952,454.

Specification of Letters Patent. Patented Mar. 22, 1910.

Application filed April 20, 1909. Serial No. 491,050.

*To all whom it may concern:*

Be it known that I, WILLIAM C. LOGAN, a citizen of the United States, residing at Headen, in the county of White and State of Georgia, have invented certain new and useful Improvements in Fly-Traps; and I do hereby declare the following to be a full, clear, and exact description of the invention, such as will enable others skilled in the art to which it appertains to make and use the same.

My invention relates to new and useful improvements in fly traps and more particularly to that class adapted to be used in connection with window and door screens and my object is to provide means on a portion of the screen to retain the flies after they have passed thereinto.

A further object is to provide means for guiding the flies or other insects into the trap.

A still further object is to provide means for preventing the flies from readily leaving the trap and a still further object is to provide means for readily removing the flies from the trap when desired.

Other objects and advantages will be hereinafter referred to and more particularly pointed out in the claims.

In the accompanying drawings forming part of this application, Figure 1 is an elevation of a screen showing my improved trap applied thereto. Fig. 2 is a vertical central sectional view thereof as seen on line 2—2, Fig. 1. Fig. 3 is a detail perspective view of the means employed for guiding the flies into the trap. Fig. 4 is a perspective view of a slide adapted to be used for retaining the flies in the trap until such time as it is desired to remove the same, and, Fig. 5 is a perspective view of the keeper employed for holding the slide.

Referring to the drawings in which similar reference numerals designate corresponding parts throughout the several views, 1 indicates a frame such as is commonly used in connection with windows, said frame having attached to one of its faces a covering of woven wire 2, said wire forming a screen against flies and other insects.

Attached to the opposite face of the frame 1 and extended substantially one-half its length, is an additional strip of woven wire 3, the placing of said wire and strip on opposite sides of the frame, forming a chamber 4 in the upper half of the frame.

In order to guide flies and other insects into the chamber 4, I provide suitable guide bars 5 and 6 which extend at an angle to each other and have their upper ends slightly separated to form a passage 7, the upper ends of said guide bars being secured together by a strip 8, which strip is likewise preferably constructed of woven wire, that portion of the wire immediately over the passage 7 having an opening 9 therein, which opening is surrounded by upstanding prongs 10 formed by parts of the woven wire, which prevents the flies from readily leaving the chamber at this point, but permitting the flies to readily enter therethrough.

The lower ends of the guide bars 5 and 6 are engaged by angular keepers 11, the upstanding portions 12 of which extend over the outer faces of the guide bars and the strip of woven wire placed thereover, while the horizontal portions 13 of the keepers extend below the ends of the guide bars and are spaced therefrom to receive and form sockets for slides 14, said slides being of such length as to extend from the ends of the guide bars to the vertical sections of the frame 1 and when so engaged, will close the space between the lower ends of the guide bars and the frame.

The object in so providing the slides 14 is to provide means for readily removing the flies from the trap, which may be accomplished by moving the slides inwardly, the inner ends of the slides having projections 15 thereon, whereby they may be readily grasped and moved inwardly and outwardly.

The object in placing the guide bars between the woven wire 2 and strip 3 is to more readily cause the flies and insects to enter the opening in the strip 8 and as the strip 3 is placed on the inner face of the frame, the flies in their endeavor to escape from the room will alight on the mesh wire and travel upwardly thereon and in view of the inclination of the guide bars, will pass upwardly through the passage 7 and the opening 9 into the interior of the chamber 4 and as egress from the chamber is closed except through the opening 9, the flies will be retained in the chamber until such time as the slides are moved inwardly to form openings between the frame and ends of the guide bars.

This device may be very cheaply constructed and readily applied to use and can be attached to window screens or door screens as desired and said screens may be of the usual or any preferred make.

In applying my device to use, the strip 3 is attached to one face of the frame and the guide bars then introduced between said strip and the wire on the opposite face of the frame, after which the keepers 11 are placed in position and a nail or the like 16 entered through an opening 17 in the vertical portion of the keeper through the strip of wire and into the guide bars 5, said nails serving to hold the guide bars in position as well as the keepers. The slides are then introduced in position, when the trap is ready for use.

Although I have shown the trap constructed in a particular form and applied to the interior of a screen, yet it will be readily understood that the trap may be manufactured in any suitable shape or angle desired or occasion may demand and further that the trap may be baited or a light placed therein to attract nocturnal winged insects of all kinds.

It will also be understood that the screen may be placed on the outside of a building to entrap flies, etc. before they enter the building.

What I claim is:

1. The combination with a frame and a mesh covering therefor; of a strip of woven material partially covering the opposite face of the frame, guide bars interposed between the covering and strip, means having an opening therein adapted to connect the upper ends of the guide bars, slides adapted to close the space between the lower ends of the guide bars and the frame and means to hold the slides in position.

2. A trap of the class described, comprising the combination with a frame having a covering over one face thereof; of a strip of covering for a part of the opposite face, a pair of guide bars adapted to extend between said coverings, a wire strip at the upper ends of the guide bars, said strip holding said bars spaced apart, said strip having an opening therein, slides adapted to normally close the space between the lower ends of the guide bars and walls of the frame and keepers at the lower ends of said guide bars.

In testimony whereof I have signed my name to this specification in the presence of two subscribing witnesses.

WILLIAM C. LOGAN.

Witnesses:
J. B. SKELTON,
J. W. H. UNDERWOOD.